Sept. 26, 1950        F. C. HOWARD        2,523,762
TILTING FEED MANGER
Filed April 22, 1948        2 Sheets-Sheet 2
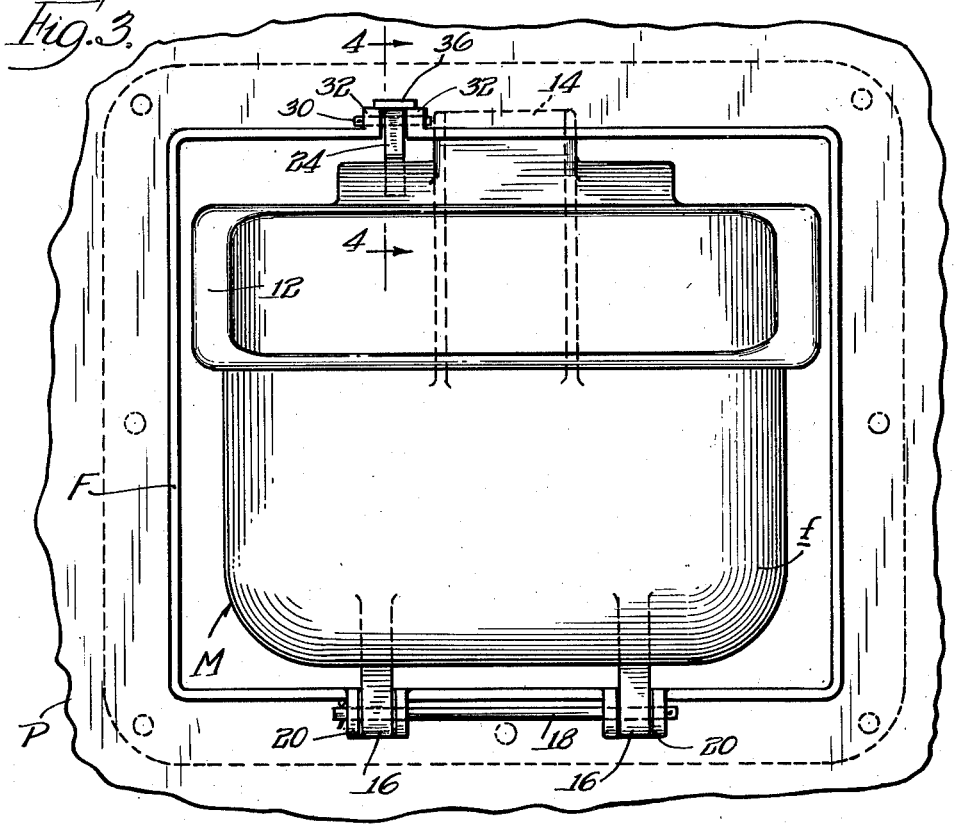
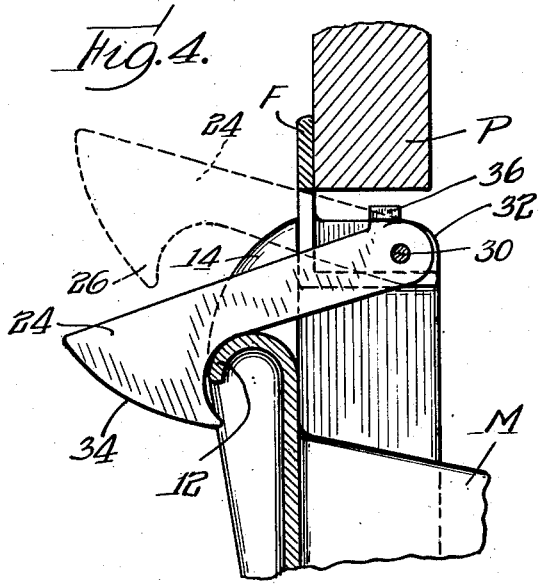
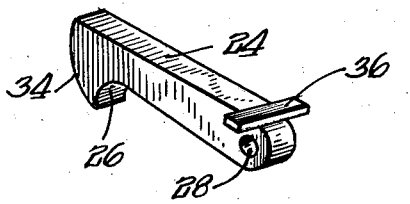
INVENTOR.
Frank C. Howard Patented Sept. 26, 1950

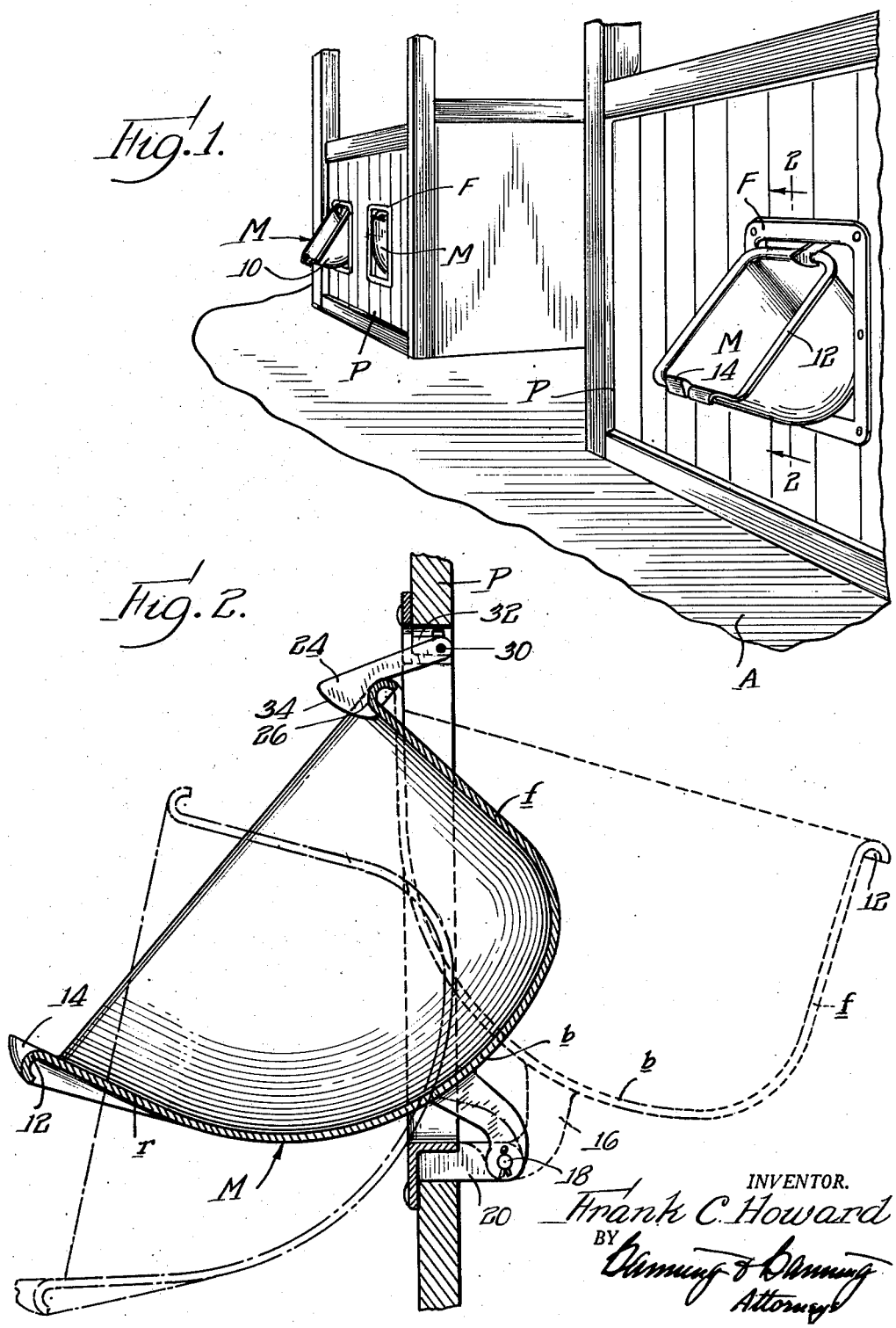

2,523,762

UNITED STATES PATENT OFFICE 2,523,762

TILTING FEED MANGER

Frank C. Howard, Chicago, Ill., assignor to Howard Foundry Company, Chicago, Ill., a corporation of Illinois Application April 22, 1948, Serial No. 22,522

2 Claims. (Cl. 119—61)

This invention relates to a tilting feed manger in the general form of a bowl which is mounted on or at an upright partition at the head end of a stall, to be moved from (1) a feeding position within the stall to (2) a filling position outside of the stall, or (3) to a discharge and cleansing position outside the stall. In the construction herein shown and described, the tilting manger is designed for individual feeding of a horse, cow, or other animal, but with increase in length it may serve as a feeder for two or more such animals.

An important object of the invention is to provide a feeder of this kind which is adapted for mounting on or at a partition at the head end of a stall or other feeding enclosure so that it is not necessary for an attendant to enter therewithin to fill the feeder or to clean it. These operations may be performed from the opposite side of the supporting partition where an aisle may conveniently be provided, the tilting of the feeder manger being accomplished by an attendant while working in the aisle.

Another object of the invention is to provide a feed manger mounted for tilting movement in a frame with which it remains in unitary relation, the frame cooperating with the manger to hold it in any one of the several positions for feeding, filling, and for cleansing.

Still a further object of the invention is to provide a feed manger pivotally mounted at the bottom of its associated frame to engage therewith at that point for holding the bowl in one position, to engage the top of the frame for holding it in another position, and to engage a releasable latch carried by the frame for holding the bowl in an intermediate position.

Other objects of the invention will appear in the ensuing specification taken in conjunction with the accompanying drawings wherein:

Figure 1 is a perspective view illustrating an aisle extending along several mangers provided for the feeding of animals in stalls which are arranged on the opposite side of the partitions which define the aisle;

Fig. 2 is an enlarged sectional view, taken on line 2—2 of Fig. 1, showing the three different positions which may be occupied by the feed manger;

Fig. 3 is an elevational view of the manger looking toward the front side thereof which faces the stall wherein is kept the animal to be fed;

Fig. 4 is a fragmentary sectional view, taken on line 4—4 of Fig. 3, showing the holding latch in two positions; and Fig. 5 is a perspective view of the latch per se.

The mounting frame F for the present feed manger M is affixed to or at a partition P at the head end of a stall. On the opposite side of this partition is an aisle A extending, if desired, along a row of such stalls. The mangers are individually adapted to be tilted outwardly so as to be accessible from the rear for servicing by an attendant in the aisle; at other times each manger remains tilted inwardly in feeding position for the animal in the stall.

The feed manger M is in the general form of a bowl, probably made of metal, and provided at the top edge with an outwardly extended flange 12 which may be flat upon the ends and curved on the front and rear where it is raised somewhat. A stop lug 14 upstands from the rear of the manger (see Figs. 1 and 2).

Depending from the bottom of the feed manger are two arms 16 pivotally connected by a pin 18 with brackets 20 which extend forwardly from the frame F at its bottom. As appears clearly in Fig. 2 this frame is made up of angle irons connected and arranged in a rectangle for fitting within an opening of corresponding shape in the partition P. One flange of each angle iron confronts the partition on the aisle side, and may be bolted or otherwise secured thereto to provide a fixed support for the manger.

The mounting of the manger is such that it is free to swing through the frame either way. Preferably the front wall $f$ of the bowl is substantially straight but curved inwardly where it joins with the bottom $b$ which is rounded and upwardly inclined toward the rear wall $r$ which is outwardly slanted in relation to the front wall. The deepest point in the manger is toward the front. When the manger is tilted inwardly to its feeding position, the stop lug 14 will engage the top bar of the frame F, the preponderance of weight then lying inwardly of the pivotal support 18 whereby the manger is held by gravity in this position. The manger is also free to be tilted rearwardly through the frame to the point that its bottom $b$ or its arms 16, or both, will engage the bottom bar of the frame F. When so positioned, the slanted rear wall $r$ of the manger is inclined below the horizontal (see Fig. 2) to permit a gravity discharge therefrom of any liquid or loose material, and to facilitate flushing thereof for cleansing purposes.

In an intermediate filling position, the top edge of the manger at its front is engaged by a latch 24 having a depending hook 26 at one end. At its opposite end the hook is formed with a cross hole 28 for receiving a pivot pin 30 which is supported between spaced ears 32 affixed to the frame top bar (see Fig. 2). At the point where the latch is mounted the top bar of the frame F is suitably notched for its accommodation. At the free end of the latch is a cam-nose 34 which, when engaged by the top edge 12 of the manger at its rear, will produce an upward swinging of the latch to permit the manger to continue its forward tilting movement to its upright feeding position. When the feeding position is reached, the stop lug 14 rising from the top edge of the manger at its rear will be engaging the top bar of the frame F. A stop to limit dropping of the latch beyond a predetermined point is provided by a cross bar 36 carried thereby, over the pivot pin 30 and toward the hook end of the latch, in position to engage the tops of the ears 32 before the latch has swung down below the movement path of the manger top edges, both front and rear. As a consequence, the latch will be held always in a position where its cam-nose will be engaged by the top of the manger, either front or rear, so as to be kicked upwardly thereby when the manger is in process of tilting forwardly to its feeding position.

To tilt the manger to its extreme rearward position, the latch must be raised to clear the top 12 at the front. Since the curved top edges at both front and rear move in coincident arcuate paths, a return tilting movement of the manger will involve two successive up-cammings of the latch in this operation; when completed, however, the latch will drop to the locking position shown in Fig. 4, thereby to prevent any rearward tilting of the manger in response to pressure exerted by the animal in the stall.

While this construction has been described in detail as applied to a feed manger in the general form of a bowl, it should be regarded as an illustration or example rather than a restriction or limitation of the invention, as various changes may be made in the construction, combination, and arrangement of the parts without departing from the spirit and scope of the invention.

I claim:

1. A feed manger in the general form of a bowl having means for tiltably mounting it to swing about an axis below its bottom through an opening in the front wall of a stall whereby the open top of the manger may be located at the inner or outer face of said wall, a latch pivotally mounted at one end above the feed manger and extending outwardly beyond said wall and provided at the outer end with a hook having a cam nose arranged to be engaged by the upper edge of either the front or rear wall of the manger in the inward swinging of the same whereby the latch is automatically lifted and engaged with the manger for latching the same against outward swinging movement, means for limiting the downward movement of the latch for positioning the latch for automatic latching engagement with the manger, and a stop carried by the front wall of the manger at the top thereof and of a length to extend beyond the top of the opening in said wall to limit inward swinging of the manger and cooperating with the latch to hold the manger rigidly against inward and outward movement when the manger is in cattle-feeding position within said stall.

2. A feed manger in the general form of a bowl, a vertically disposed rectangular frame having flanged top, bottom and sides and adapted to be fitted in the front wall of a stall and provided at the bottom with pairs of spaced inwardly extending brackets and having spaced ears at the top, arms depending from the bottom of the manger and pivotally connected by pins in the brackets, whereby it is pivotally mounted to swing on an axis below its bottom through the opening for positioning at the inner or outer face of said wall, a latch pivotally mounted at one end in said ears and located above the feed manger and extending outwardly beyond the frame and provided at the outer end with a hook having a cam nose arranged to be engaged by the upper edge of either the front or rear wall of the manger in the inward swinging of the same whereby the latch is automatically lifted and engaged with the manger for latching the same against outward swinging movement, means for limiting the downward movement of the latch for positioning the latch for automatic latching engagement with the manger, and a stop carried by the front wall of the manger at the top thereof and of a length to engage the top of the frame to limit inward swinging of the manger and cooperating with the latch to hold the manger rigidly against inward and outward movement when the manger is in cattle-feeding position within said stall.

FRANK C. HOWARD.

REFERENCES CITED

The following references are of record in the file of this patent:

UNITED STATES PATENTS

| Number | Name | Date |
| --- | --- | --- |
| 430,950 | Hicks | June 24, 1890 |
| 772,713 | Haas | Oct. 18, 1904 |
| 1,124,058 | Neller | Jan. 5, 1915 |
| 1,234,496 | Seeling | July 24, 1917 |
| 1,447,562 | Mattson et al. | Mar. 6, 1923 |
| 1,755,337 | Schettl | Apr. 22, 1930 |
| 2,015,925 | De Wolf | Oct. 1, 1935 |

FOREIGN PATENTS

| Number | Country | Date |
| --- | --- | --- |
| 104,954 | Switzerland | May 16, 1924 |